(12) United States Patent
Kim et al.

(10) Patent No.: US 8,867,457 B2
(45) Date of Patent: Oct. 21, 2014

(54) METHOD OF TRANSMITTING CONTROL INFORMATION WIRELESS

(75) Inventors: Hak Seong Kim, Anyang-si (KR); Bong Hoe Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 397 days.

(21) Appl. No.: 12/733,207

(22) PCT Filed: Sep. 12, 2008

(86) PCT No.: PCT/KR2008/005415
§ 371 (c)(1),
(2), (4) Date: Feb. 17, 2010

(87) PCT Pub. No.: WO2009/035297
PCT Pub. Date: Mar. 19, 2009

(65) Prior Publication Data
US 2010/0142475 A1    Jun. 10, 2010

Related U.S. Application Data

(60) Provisional application No. 60/972,255, filed on Sep. 14, 2007.

(51) Int. Cl.
*H04W 72/04* (2009.01)
*H04L 5/00* (2006.01)

(52) U.S. Cl.
CPC ............. *H04L 5/0053* (2013.01); *H04L 5/0007* (2013.01)
USPC ............................ 370/329; 370/295; 370/344

(58) Field of Classification Search
USPC ......................................... 370/329, 295, 344
See application file for complete search history.

(56) References Cited

U.S. PATENT DOCUMENTS

| 8,160,018 B2 * | 4/2012 | Zhang et al. ................... 370/330 |
| 2008/0075184 A1 * | 3/2008 | Muharemovic et al. ...... 375/260 |
| 2012/0069793 A1 * | 3/2012 | Chung et al. ................... 370/315 |

FOREIGN PATENT DOCUMENTS

| JP | 2010-525708 A | 7/2010 |
| JP | 2010-536229 A | 11/2010 |
| KR | 10-2007-0070379 A | 7/2007 |
| KR | 10-2007-0090343 A | 9/2007 |

OTHER PUBLICATIONS

A. Ghosh, et al., "Uplink control channel design for 3GPP LTE", IEEE 18th International Symposium on Personal, Indoor and Mobile Radio Communications 2007, pp. 1-5, Sep. 3-7, 2007.

(Continued)

*Primary Examiner* — Donald Mills
*Assistant Examiner* — Henry Baron
(74) *Attorney, Agent, or Firm* — Mckenna Long & Aldridge LLP

(57) ABSTRACT

A method of transmitting control information includes generating a cyclically shifted sequence by cyclically shifting a base sequence by a cyclic shift amount, generating a modulated sequence based on a modulation symbol for control information and the cyclically shifted sequence, and transmitting the modulated sequence on a plurality of subcarriers, wherein available cyclic shifts of the base sequence are divided into a first part and a second part according to a type of the control information, and the first part and the second part are separated by at least one unallocated cyclic shift of the base sequence.

7 Claims, 11 Drawing Sheets

(56) References Cited

OTHER PUBLICATIONS

M. Gidlund, et al., "Enhanced HARQ scheme based on rearrangement of signal constellations and frequency diversity for OFDM systems", 2004 IEEE 59th Vehicular Technology Conference, vol. 1, pp. 500-504, May 17-19, 2004.

Panasonic, "Variable Phase Definition of the Reference Signal for CQI in PUCCH", Agenda item 7.2.4 Uplink Control Channel, 3GPP TSG RAN WG1 Meeting #50, Athens, Greece, Aug. 20-24, 2007, R1-073621.

Samsung, "UL ACK/NACK channel structure", Agenda item 7.2.4, 3GPP TSG RAN WG1 Meeting #50, Agenda item 7.2.4, 3GPP TSG RAN WG1 Meeting #50, Athens, Greece, Aug. 20-24, 2007, R1-073541.

Nokia Siemens Networks, Nokia, "Cyclic Shift Hopping and DM RS Signaling", Agenda item 7.11.2, 3GPP TSG RAN WG1 Meeting #49, Kobe, japan, May 7-11, 2007, R1-072294.

NTT DoCoMo, Ericsson, Mitsubishi Electric, NEC, "Sequence Hopping and Cyclic-Shift Valve Hopping for Uplink Reference Signal in E-UTRA", Agenda 7.10.2, 3GPP TSG RAN WG1 Meeting #48bis, St. Julians, Malta, Mar. 26-30, 2007, R1-071643.

NTT DoCoMo, Fujitsu, KDDI, Mitsubishi Electric, Sharp, "CDMA-Based Multiplexing Method for Multiple ACK/NACK and CQI in E-UTRA Uplink", Agenda Item 7.11.1, 3GPP TSG RAN WG1 Meeting #48bis, St. Julians, Malta, Mar. 26-30, 2007 (Original R1-062742), R1-071649.

Ghosh, Amitava et al. "Uplink Control Channel Design for 3GPP LTE." The 18th Annual IEEE International Symposium on PIMRC. 2007. pp. 1-5.

Gidlund, Mikael et al. "Enhanced HARQ Scheme based on Rearrangement of Signalk Constellations and Frequency Diversity for OFDM Systems." IEEE. 2004. pp. 500-504.

\* cited by examiner

METHOD OF TRANSMITTING CONTROL INFORMATION WIRELESS

This application is a national phase application based on International Application No. PCT/KR2008/005415, filed on Sep. 12, 2008, which claims priority to U.S. Provisional Application No. 60/972,255, filed Sep. 14, 2007, all of which are incorporated by reference for all purposes as if fully set forth herein.

TECHNICAL FIELD

The present invention provides wireless communications, and more particularly, to a method of transmitting control information in a wireless communication system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

While having almost the same complexity with the OFDMA, SC-FDMA has a lower peak-to-average power ratio (PAPR) due to a single carrier property. Since the low PAPR is advantageous for a user equipment (UE) in terms of transmission power efficiency, the SC-FDMA is adopted for uplink transmission in a 3rd generation partnership project (3GPP) long term evolution (LTE) as disclosed in section 5 of 3GPP TS 36.211 V8.0.0 (2007 September) "Technical Specification Group Radio Access Network; Evolved Universal Terrestrial Radio Access (E-UTRA); Physical channels and modulation (Release 8)".

Meanwhile, a variety of uplink control information is transmitted through an uplink control channel. Examples of the uplink control information include acknowledgement (ACK)/not-acknowledgement (NACK) for performing hybrid automatic repeat request (HARM), a channel quality indicator (CQI) indicating downlink channel quality, a scheduling request (SR) requesting resource allocation for uplink transmission, etc.

Occurrence of errors during the transfer of the uplink control information may cause performance deterioration of the entire wireless communication system. Thus, it is necessary to transmit the uplink control information with high reliability. Accordingly, there is a need for a method capable of effectively transmitting uplink control information to improve system performance.

DISCLOSURE OF INVENTION

Technical Problem

The present invention provides a method of transmitting control information by using a cyclically shifted sequence.

Technical Solution

In an aspect, a method of transmitting control information in a wireless communication system includes generating a cyclically shifted sequence by cyclically shifting a base sequence by a cyclic shift amount, generating a modulated sequence based on a modulation symbol for control information and the cyclically shifted sequence, and transmitting the modulated sequence on a plurality of subcarriers, wherein available cyclic shifts of the base sequence are divided into a first part and a second part according to a type of the control information, and the first part and the second part are separated by at least one unallocated cyclic shift of the base sequence.

In another aspect, an apparatus for wireless communication includes a memory for storing a base sequence, and a processor coupled with the memory and configured to generate a cyclically shifted sequence by cyclically shifting the base sequence and for generating a modulated sequence based on a modulation symbol for control information and the cyclically shifted sequence, wherein available cyclic shifts of the base sequence are divided into a plurality of parts according to a type of the control information, and each part is separated by at least one unallocated cyclic shift of the base sequence.

In still another aspect, a method of allocating radio resources in a wireless communication system includes allocating cyclic shifts belonging to a first part of available cyclic shifts of a base sequence to a first type of control information, and allocating cyclic shifts belonging to a second part of the available cyclic shifts of the base sequence to a second type of control information, wherein the first part of available cyclic shifts of the base sequence and the second part of available cyclic shifts of the base sequence are separated by at least one unallocated cyclic shift.

Advantageous Effects

Mutual interference can be reduced even if a plurality of pieces of control information are transmitted. System performance can be improved by increasing reliability for transmission of control information.

MODE FOR THE INVENTION

A technique described below can be applied in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IE EE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink.

For clarity, the following description will focus on the 3GPP LTE. However, the technical features of the present invention are not limited thereto.

Figure 1:
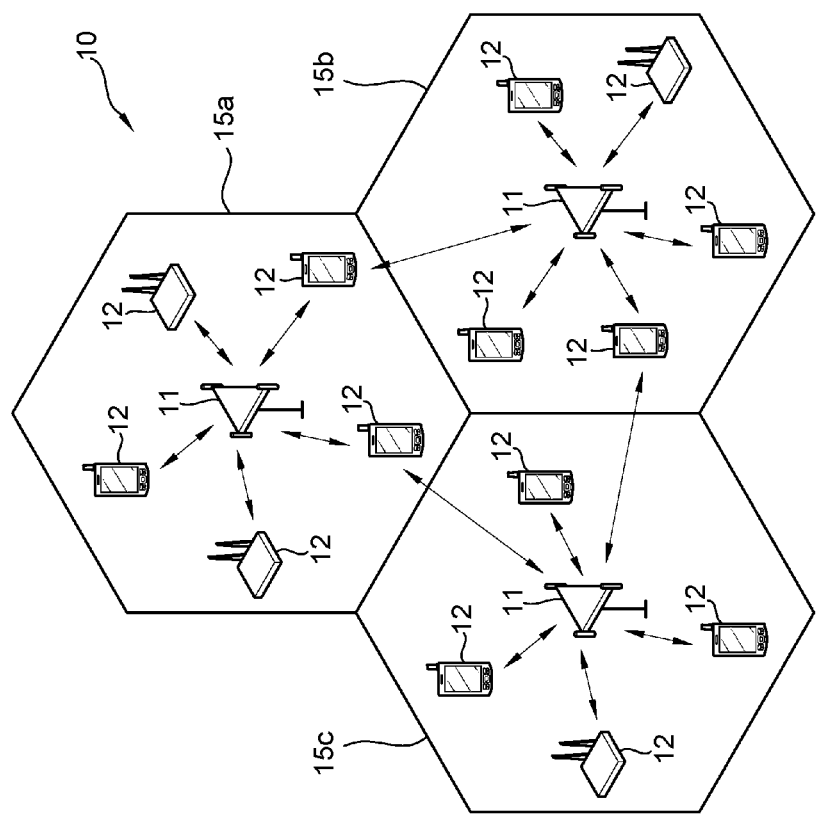
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In downlink, a transmitter may be a part of the BS, and a receiver may be a part of the UE. In uplink, the transmitter may be a part of the UE, and the receiver may be a part of the BS.

The wireless communication system can support uplink and/or downlink hybrid automatic repeat request (HARQ). In addition, a channel quality indicator (CQI) can be used for link adaptation.

Figure 2:
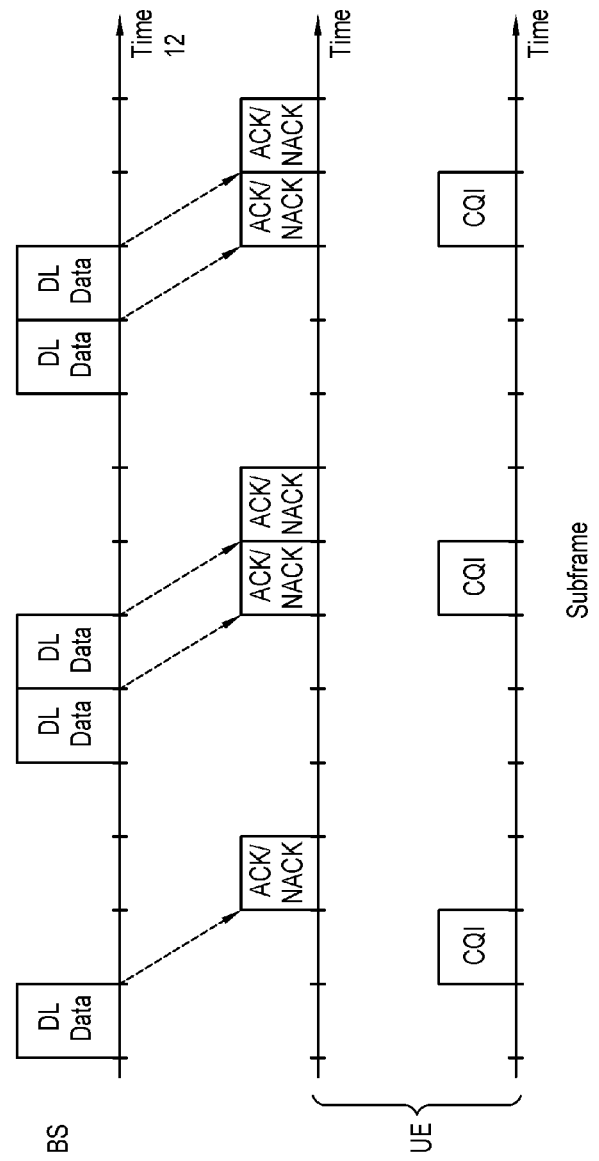
FIG. 2 shows downlink HARQ and CQI transmission.

FIG. 2 shows downlink HARQ and CQI transmission.

Referring to FIG. 2, upon receiving downlink data from a BS, a UE transmits acknowledgement (ACK)/not-acknowledgment (NACK) information after a specific time elapses. The ACK/NACK information is ACK information when the downlink data is successfully decoded. The ACK/NACK information is NACK information when the downlink data is unsuccessfully decoded. Upon receiving the NACK information, the BS can retransmit the downlink data until the ACK information is received or until retransmission is performed the number of times corresponding to a maximum number of retransmissions.

Resource allocation or a transmission time of the ACK/NACK information on the downlink data may be dynamically reported by the BS by using signaling, or may be predetermined according to the resource allocation or the transmission time of the downlink data.

The UE can report a CQI periodically and/or non-periodically to the BS by measuring a downlink channel state. The BS can perform downlink scheduling by using the CQI. The BS can inform the UE of a CQI transmission time or resource allocation information.

Figure 3:
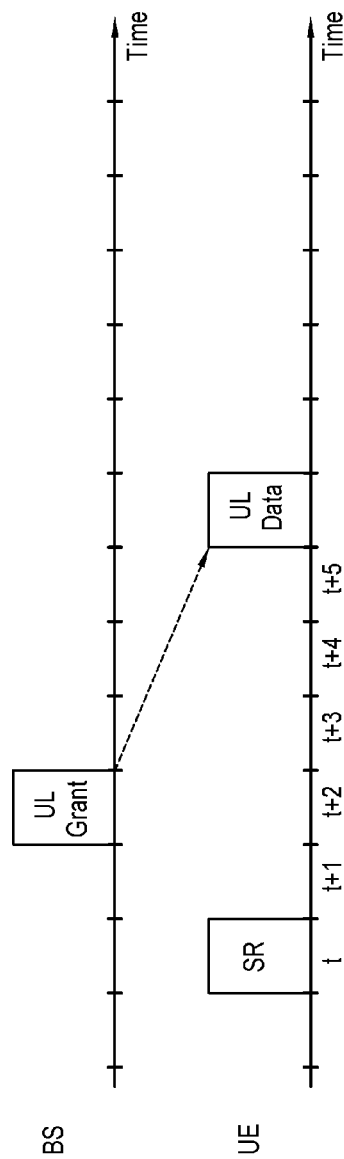
FIG. 3 shows uplink transmission.

FIG. 3 shows uplink transmission.

Referring to FIG. 3, for uplink transmission, a UE first transmits a scheduling request (SR) to a BS. The SR is used when the UE requests the BS to allocate an uplink radio resource. The SR is a sort of preliminary information exchange for data exchange. In order for the UE to transmit uplink data to the BS, radio resource allocation is first requested by using the SR.

In response to the SR, the BS transmits an uplink grant to the UE. The uplink grant includes allocation of the uplink radio resource. The UE transmits uplink data by using the allocated radio resource.

As shown in FIGS. 2 and 3, the UE can transmit uplink control information (i.e., ACK/NACK, CQI, and SR) in a given subframe. The type and size of control information may vary depending on systems, and the technical features of the present invention are not limited thereto.

Figure 4:
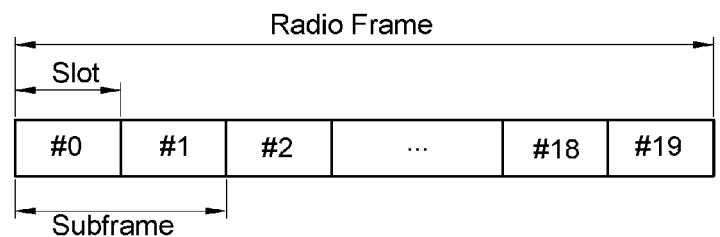
FIG. 4 shows a structure of a radio frame in a 3GPP LTE.

FIG. 4 shows a structure of a radio frame in 3GPP LTE.

Referring to FIG. 4, a radio frame includes 10 subframes. One subframe includes two slots. A time for transmitting one subframe is defined as a transmission time interval (TTI). For example, one subframe may have a length of 1 millisecond (ms), and one slot may have a length of 0.5 ms.

One slot includes a plurality of SC-FDMA symbols in a time domain and a plurality of resource blocks (RBs) in a frequency domain. In the 3GPP LTE using the SC-FDMA symbol in uplink, the SC-FDMA symbol represents one symbol period. According to a system, the SC-FDMA symbol can also be referred to as an OFDMA symbol or a symbol period. The RB is a resource allocation unit, and includes a plurality of contiguous subcarriers over one slot.

The structure of the radio frame is shown for exemplary purposes only. Thus, the number of subframes included in the radio frame or the number of slots included in the subframe or the number of SC-FDMA symbols included in the slot may be modified in various manners.

Figure 5:
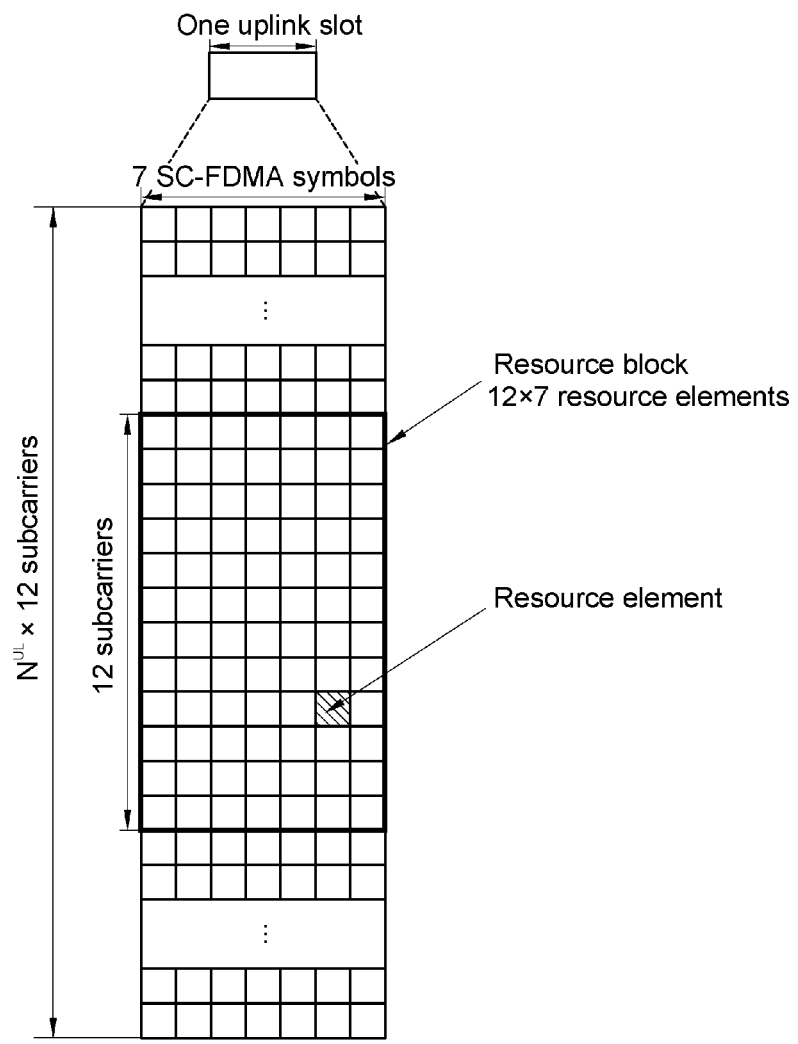
FIG. 5 shows an example of a resource grid for one uplink slot.

FIG. 5 shows an example of a resource grid for one uplink slot.

Referring to FIG. 5, an uplink slot includes a plurality of SC-FDMA symbols in a time domain and a plurality of resource blocks (RBs) in a frequency domain. It is shown herein that one uplink slot includes 7 SC-FDMA symbols and one resource block includes 12 subcarriers. However, this is for exemplary purposes only, and thus the present invention is not limited thereto.

Each element of the resource grid is referred to as a resource element. One resource block includes 12×7 resource elements. The number $N^{UL}$ of resource blocks included in the uplink slot is dependent on an uplink transmission bandwidth determined in a cell.

Figure 6:
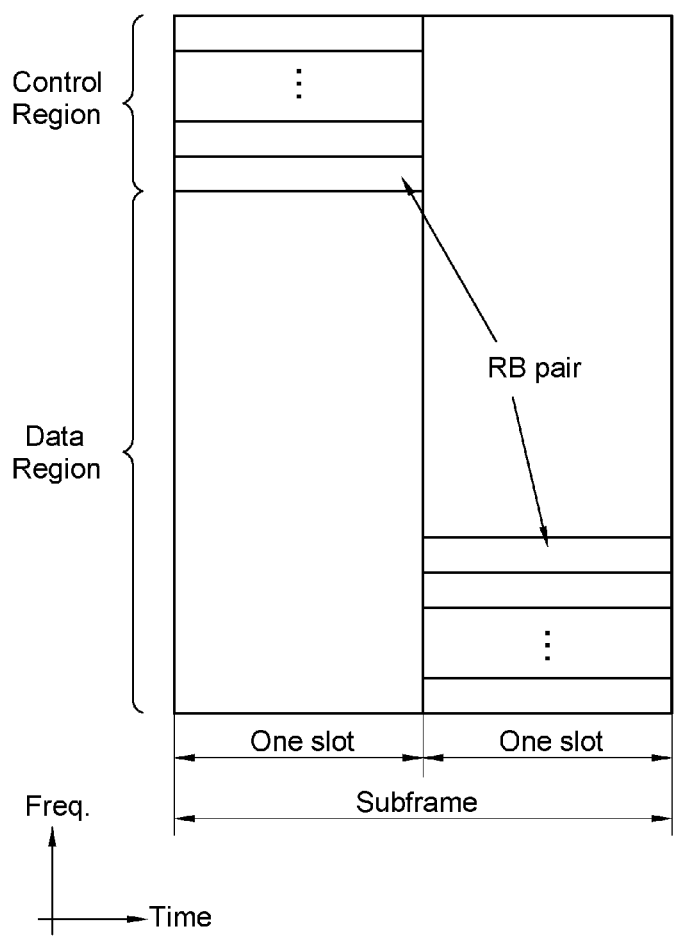
FIG. 6 shows a structure of an uplink subframe.

FIG. 6 shows a structure of an uplink subframe.

Referring to FIG. 6, an uplink subframe can be divided in frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

The PUCCH can support multiple formats. That is, the PUCCH can transmit uplink control information whose number of bits differs in each frame according to a modulation scheme. For example, when using binary phase shift keying (BPSK), 1-bit uplink control information can be transmitted on the PUCCH, and when using quadrature phase shift keying (QPSK), 2-bit uplink control information can be transmitted on the PUCCH.

Figure 7:
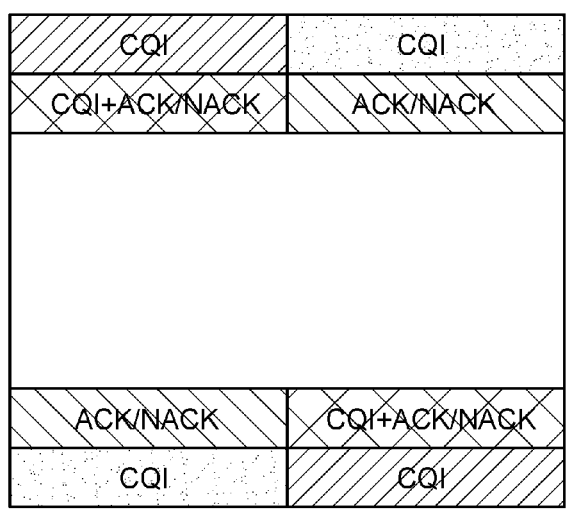
FIG. 7 shows an example of resource allocation for transmitting uplink control information.

FIG. 7 shows an example of resource allocation for transmitting uplink control information.

Referring to FIG. 7, for an RB pair #0 and an RB pair #1, only resources for CQI transmission are allocated. For an RB pair #2, resources for CQI and ACK/NACK transmission are allocated. For an RB pair #3, resources for ACK/NACK transmission are allocated. Since resources for transmitting a plurality of pieces of control information are allocated for the RB pair #2, such an RB is also referred to as a mixed RB so as to be differentiated from other RBs for transmitting one piece of control information.

The control information can be transmitted using a cyclically shifted sequence. The cyclically shifted sequence can be generated by cyclically shifting a base sequence by a specific cyclic shift (CS) amount. Various types of sequences can be used as the base sequence. For example, well-known sequences such as a pseudo noise (PN) sequence, a Zadoff-Chu (ZC) sequence, etc., can be used as the base sequence. If one RB includes 12 subcarriers, the base sequence may be a sequence having a length of 12 as follows.

MathFigure 1

$$r_i(n) = e^{jb(n)\pi/4}$$ [Math.1]

Herein, $i \in \{0, 1, \ldots, 29\}$ denotes a root index, and n denotes an element index in the range of $0 \leq n \leq N-1$, where N is a sequence length. If another root index is used, the base sequence is defined differently. If N=12, b(n) is defined as shown in the following table.

Table 1

TABLE 1

| i | b(0), ..., b(11) |
|---|---|
| 0  | -1  1  3 -3  3  3  1  1  3  1 -3  3 |
| 1  |  1  1  3  3  3 -1  1 -3 -3  1 -3  3 |
| 2  |  1  1 -3 -3 -3 -1 -3 -3  1 -3  1 -1 |
| 3  | -1  1  1  1  1 -1 -3 -3  1 -3  3 -1 |
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 | -1  3 -1  1  1 -3 -3 -1 -3 -3  3 -1 |
| 11 |  3  1 -1 -1  3  3 -3  1  3  1  3  3 |
| 12 |  1 -3  1  1 -3  1  1  1 -3 -3 -3  1 |
| 13 |  3  3 -3  3 -3  1  1  3 -1 -3  3  3 |
| 14 | -3  1 -1 -3 -1  3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

A base sequence r(n) can be cyclically shifted as follows.

MathFigure 2

$$r(n,a) = r((n+a) \bmod N), \text{ for } n=0, \ldots, N-1$$ [Math.2]

Herein, 'a' denotes a cyclic shift (CS) amount, and 'mod' denotes a modulo operation. The number of available CSs differs depending on a CS unit. If a CS can be performed in a one-subcarrier (or one-element) unit, 'a' can be any value in the range of 0 to N−1, and the number of available CSs is N. If the CS can be performed in a two-subcarrier unit, 'a' can be any value included in a set of $\{0, 2, 4, \ldots, N-1\}$, and the number of CSs is N/2.

Hereinafter, an available CS of a base sequence denotes a CS that can be derived from the base sequence according to a CS unit. For example, if the base sequence has a length of 12 and the CS unit is 1, then the total number of available CSs of the base sequence is 12. If the base sequence has a length of 12 and the CS unit is 6, the total number of available CSs is 6.

Figure 8:
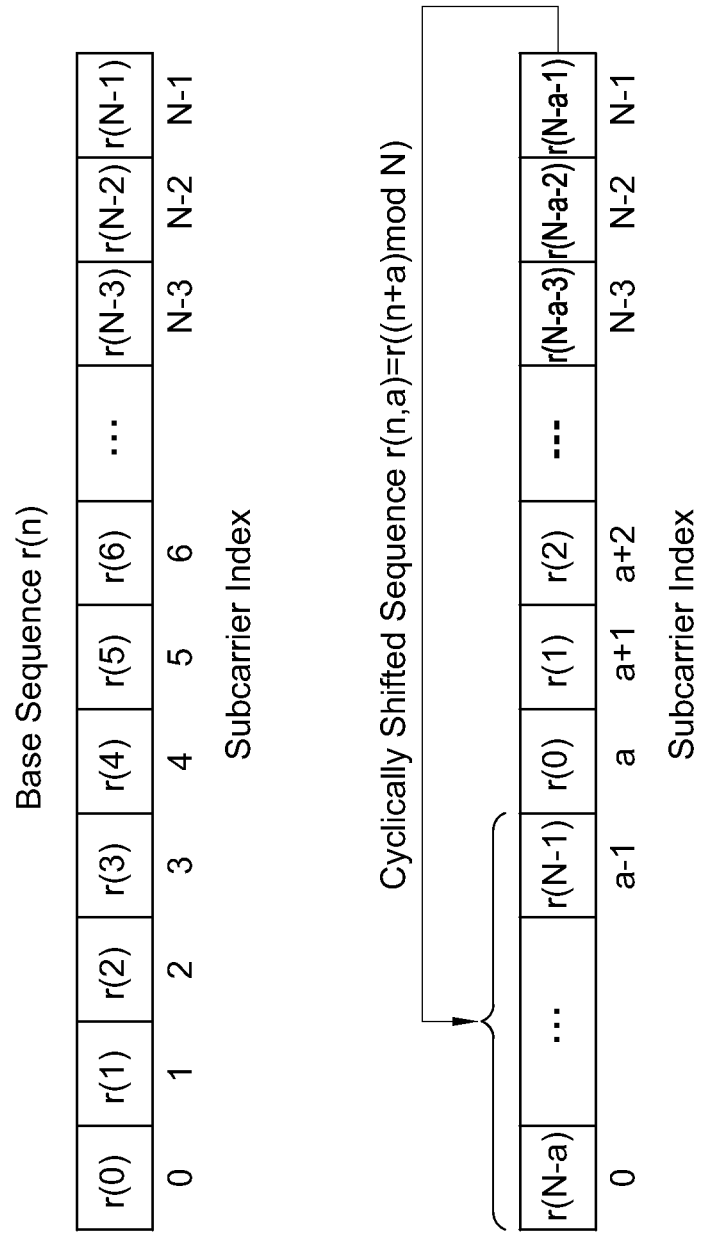
FIG. 8 illustrates a base sequence r(n) and a cyclically shifted sequence r(n,a).

FIG. 8 illustrates a base sequence r(n) and a cyclically shifted sequence r(n,a). The base sequence r(n) has a length of N and consists of N elements r(0) to r(N−1). The cyclically shifted sequence r(n,a) is generated by cyclically shifting the N elements r(0) to r(N−1) by a CS amount 'a'. That is, elements r(0) to r(N−a−1) are mapped to subcarrier indices starting from a subcarrier index 'a', and elements r(N−a) to r(N−1) are shifted to a first position of the cyclically shifted sequence r(n,a).

Figure 9:
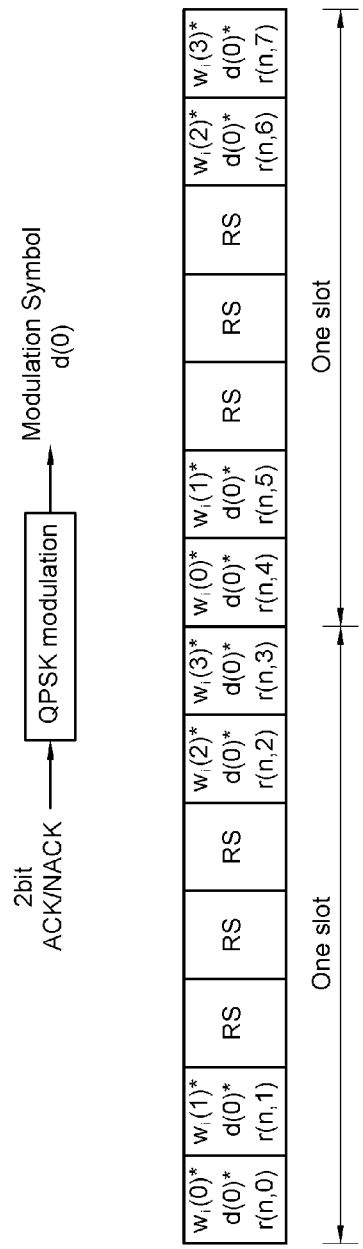
FIG. 9 shows transmission of ACK/NACK information.

FIG. 9 shows transmission of ACK/NACK information.

Referring to FIG. 9, among 7 SC-FDMA symbols included in one slot, a reference signal (RS) is carried on three SC-FDMA symbols, and the ACK/NACK information is carried on the remaining four SC-FDMA symbols. The RS is carried on three contiguous SC-FDMA symbols in a middle portion of the slot. The position and number of symbols used in the RS can vary, which may lead to variation in the position and number of symbols used in the ACK/NACK information.

To transmit the ACK/NACK information, 2-bit ACK/NACK information is QPSK-modulated to generate one modulation symbol d(0). A modulated sequence m(n) is generated according to the modulation symbol d(0) and a cyclically shifted sequence r(n,a). The cyclically shifted sequence r(n,a) can be multiplied by the modulation symbol to generate the modulated sequence m(n) as follows.

MathFigure 3

$$m(n) = d(0)r(n,a)$$ [Math.3]

A CS amount of the cyclically shifted sequence r(n,a) may differ according to each SC-FDMA symbol or may be constant. Although the CS amount 'a' for four SC-FDMA symbols in one slot is sequentially set to 0, 1, 2, and 3 herein, this is for exemplary purposes only.

To increase a UE capacity, a modulated sequence can be spread using an orthogonal sequence. An orthogonal sequence $w_i(k)$ (where i is a sequence index, and k is in the range of $0 \leq k \leq K-1$) having a spreading factor K=4 can use the following sequence.

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Alternatively, an orthogonal sequence $w_i(k)$ (where i is a sequence index, and k is in the range of $0 \leq k \leq K-1$) having a spreading factor K=3 can use the following sequence.

TABLE 3

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

It is shown herein that a sequence modulated using the orthogonal sequence $w_i(k)$ having the spreading factor K=4 is spread for four SC-FDMA symbols in one slot for ACK/NACK information.

The number of bits for the ACK/NACK information is not limited to 2 bits. Thus, the ACK/NACK information may have 1 bit or more bits. A modulation scheme is not limited to QPSK. Thus, BPSK or another modulation scheme having a higher order can also be used. For example, for 1-bit ACK/NACK information, one modulation symbol is generated using the BPSK modulation, and then a modulated sequence can be generated based on the modulation symbol and a cyclically shifted sequence.

An RS can be generated based on an orthogonal sequence and a cyclically shifted sequence generated from the same base sequence. That is, the cyclically shifted sequence can be used as the RS after spreading the cyclically shifted sequence by using the orthogonal sequence $w_i(k)$ having a spreading factor K=3.

The same structure of ACK/NACK can be used for SR transmission. An SR can be detected by examining only presence/absence of PUCCH transmission. Thus, a specific value (e.g., d(0)=1) can be used as a modulation symbol. A BS can identify the SR or the ACK/NACK by using a CS index of a base sequence. That is, SR transmission is recognized when a sequence in use is cyclically shifted by a CS allocated for the SR, and ACK/NACK transmission is recognized when a sequence in use is cyclically shifted by a CS allocated for the ACK/NACK.

Figure 10:
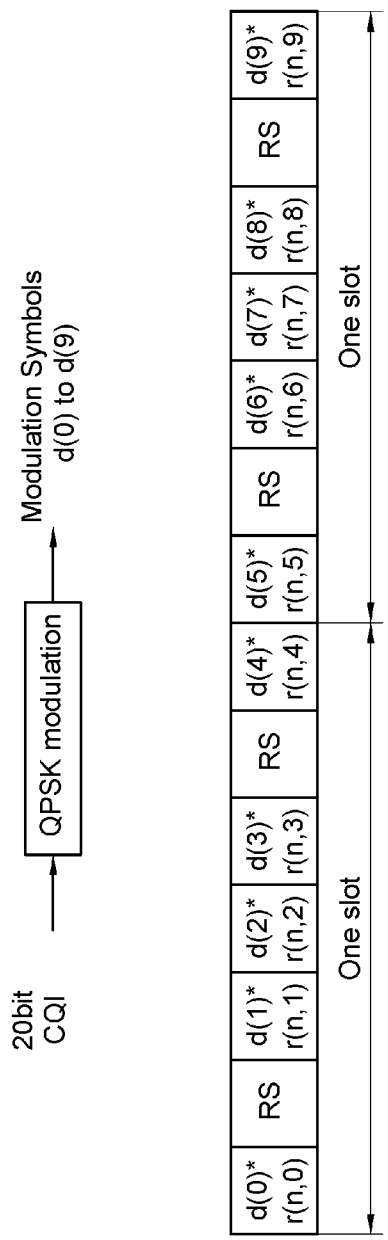
FIG. 10 shows CQI transmission.

FIG. 10 shows CQI transmission.

Referring to FIG. 10, among 7 SC-FDMA symbols included in one slot, an RS is carried on two SC-FDMA symbols, and a CQI is carried on the remaining five SC-FDMA symbols. The position and number of symbols used in the RS can vary, which may lead to variation in the position and number of symbols used in the CQI.

When a 20-bit CQI is considered, 10 modulation symbols d(0) to d(9) are generated using a QPSK modulation. A modulated sequence is generated according to the modulation symbols d(0) to d(9) and a cyclically shifted sequence r(n,a).

A CS amount of the cyclically shifted sequence r(n,a) may differ according to each SC-FDMA symbol or may be constant. Although the CS amount 'a' for 10 SC-FDMA symbols for the CQI is sequentially set to 0, 1, 2, . . . , 9 herein, this is for exemplary purposes only.

The RS can use the cyclically shifted sequence. Unlike the transmission of the ACK/NACK information, the orthogonal sequence is not used.

According to the aforementioned uplink control information configuration, examples of resource allocation information for configuring the uplink control channel that carries the uplink control information are as follows.

(1) a root index of a base sequence for control information
(2) a CS index of a base sequence for control information
(3) an index (excluding CQI) of an orthogonal sequence for control information
(4) a root index of a base sequence for RS
(5) a CS index of a base sequence for RS
(6) an index (excluding CQI) of an orthogonal sequence for RS The resource allocation information can be directly reported from a BS to a UE. However, this may result in the increase of an overhead caused by signaling.

For anther example, the resource allocation information can be predicted from information transmitted from the BS. That is, if the resource allocation information is 1:1 mapped to a certain resource (or index), the UE can configure the uplink control channel by only receiving the resource. In addition, system efficiency can be increased by excluding a resource which may adversely affect overall system performance in a 1:1 mapping relation.

A method proposed to define the 1:1 mapping is based on the following four principles.

First, the number of available CSs of a base sequence is generally equal to a length of the base sequence. However, if separate UEs uses cyclically shifted sequences generated by immediately adjacent CSs, significant interference may occur in an environment having a large delay spread. Therefore, it is preferable not to use adjacent CSs in case of using the same orthogonal sequence.

Second, when an orthogonal sequence has a length of 4, interference may exist among other orthogonal sequences in a high-speed channel environment. This is because orthogonality of the orthogonal sequence is maintained when each SC-FDMA symbol is transmitted through the same channel. Channels through which SC-FDMA symbols are transmitted may vary in a high-speed environment, and thus it may be difficult to maintain the orthogonality of the orthogonal sequence. In addition, since an interference effect may vary between orthogonal sequences, it is preferable that an orthogonal sequence having high interference is not allocated to UEs to which the same cyclically shifted sequence is allocated.

Third, a BS can receive a plurality of pieces of control information by using one RB. This is because, even if one piece of control information alone is transmitted on one RB (or one uplink control channel) at one time to maintain a single carrier property in principle, from the perspective of the BS, several pieces of control information can be simultaneously transmitted on the same RB by a plurality of UEs. Different CSs are used to separate different pieces of control information.

Forth, in case of using similar CSs, an orthogonal sequence having a good throughput is first allocated. The orthogonal sequence having a good throughput is a sequence having lowest interference with other orthogonal sequences.

Now, resource allocation information for configuration an uplink control channel by using the aforementioned four principles will be described. It will be assumed hereinafter that the number of available CSs of a base sequence is equal to the number of subcarriers included in an RB, and the number of available CSs is set to 12.

Table 4 shows resource allocation according to a first embodiment of the present invention.

TABLE 4

| | Ios | | |
|---|---|---|---|
| Ics | 1 | 2 | 3 |
| 1 | AN1 | AN2 | |
| 2 | | | AN3 |
| 3 | AN4 | AN5 | |
| 4 | | | AN6 |
| 5 | AN7 | AN8 | |
| 6 | | | AN9 |
| 7 | AN10 | AN11 | |

TABLE 4-continued

| Ics | Ios 1 | Ios 2 | Ios 3 |
|---|---|---|---|
| 8 | | | AN12 |
| 9 | AN13 | AN14 | |
| 10 | | | AN15 |
| 11 | AN16 | AN17 | |
| 12 | | | AN18 |

Herein, Ios denotes an index of an orthogonal sequence, and Ics denotes a CS index of a base sequence. ANx denotes an index of resource allocation information for ACK/NACK information. When there are a total of 18 ACK/NACK indices, it means that indices can be respectively allocated up to 18 UEs.

First, starting from a first CS, an ACK/NACK resource is allocated. Only two orthogonal sequences are allocated to reduce orthogonal sequence interference in one CS. The remaining one orthogonal sequence is allocated to an immediately next CS. Again, two orthogonal sequences are allocated to a next CS. By increasing an interval between resources having high interference, detection performance of control information can be increased.

An RS resource can be allocated similarly to the allocation of the ACK/NACK resource.

Table 5 shows resource allocation according to a second embodiment of the present invention.

TABLE 5

| Ics | Ios 1 | Ios 2 | Ios 3 |
|---|---|---|---|
| 1 | AN1 | | AN3 |
| 2 | | AN2 | |
| 3 | AN4 | | AN6 |
| 4 | | AN5 | |
| 5 | AN7 | | AN9 |
| 6 | | AN8 | |
| 7 | AN10 | | AN12 |
| 8 | | AN11 | |
| 9 | AN13 | | AN15 |
| 10 | | AN14 | |
| 11 | AN16 | | AN18 |
| 12 | | AN17 | |

In comparison with the embodiment of Table 4, different CSs are allocated for two orthogonal sequences.

Table 6 shows resource allocation according to a third embodiment of the present invention.

TABLE 6

| Ics | Ios 1 | Ios 2 | Ios 3 |
|---|---|---|---|
| 1 | AN1 | | |
| 2 | | AN2 | AN3 |
| 3 | AN4 | | |
| 4 | | AN5 | AN6 |
| 5 | AN7 | | |
| 6 | | AN8 | AN9 |
| 7 | AN10 | | |
| 8 | | AN11 | AN12 |
| 9 | AN13 | | |
| 10 | | AN14 | AN15 |
| 11 | AN16 | | |
| 12 | | AN17 | AN18 |

Table 7 shows resource allocation according to a fourth embodiment of the present invention.

TABLE 7

| Ics | Ios 1 | Ios 2 | Ios 3 |
|---|---|---|---|
| 1 | AN1 | AN2 | |
| 2 | | | AN3 |
| 3 | AN4 | AN5 | |
| 4 | | | AN6 |
| 5 | AN7 | AN8 | |
| 6 | | | AN9 |
| 7 | AN10 | AN11 | |
| 8 | | | AN12 |
| 9 | | N/A | |
| 10 | | CQI | |
| 11 | | | |
| 12 | | | |

This is a case of a mixed RB, that is, resources for a plurality of pieces of control information are allocated to one RB. 'N/A' denotes an unallocated CS. CSs for each piece of control information are contiguous. Resources of respective pieces of control information are separated by at least one unallocated CS. The unallocated CS denotes a CS which is not allocated to any UE. The unallocated CS can also be referred to as another terminology, such as, a guard CS, a reserved CS, an unused CS, etc.

Herein, CS indices 1 to 8 are set to a first part for ACK/NACK, and CS indices 10 to 12 are set to a second part for CQI. A BS allocates the CS indices belonging to the first part to an ACK/NACK resource, and allocates the CS indices belonging to the second part to a CQI resource. The CS index 9 is arranged between the first part and the second part. As an unused CS for identifying each piece of control information, the CS index 9 is not allocated to any UE (or control information).

According to a type of control information, available CSs of a base sequence are divided into each part, and an unallocated CS of the base sequence is arranged between each part. By preventing adjacent CSs from being allocated between different types of control information, interference can be reduced and transfer reliability of control information can be improved.

Table 8 shows resource allocation according to a fifth embodiment of the present invention.

TABLE 8

| Ics | Ios 1 | Ios 2 | Ios 3 |
|---|---|---|---|
| 1 | AN1 | AN2 | |
| 2 | | | AN3 |
| 3 | AN4 | AN5 | |
| 4 | | | AN6 |
| 5 | AN7 | AN8 | |
| 6 | | | AN9 |
| 7 | AN10 | AN11 | |
| 8 | | | AN12 |
| 9 | | N/A | |
| 10 | | CQI | |
| 11 | | | |
| 12 | | N/A | |

In comparison with the embodiment of Table 7, unallocated CSs are arranged at both sides of a CQI. That is, two unallocated CSs are used.

According to a characteristic of CS, when a base sequence is cyclically shifted by a maximum CS amount, the same sequence is obtained. Therefore, if available CSs of the base sequence are divided into two parts according to a type of control information, two boundaries are created. In Table 8 above, a 9th CS and a 12th CS are indicated by 'N/A' and belong to boundaries of the two parts. The 9th CS and the 12th CS belonging to the respective boundaries are set to unallocated CSs, and thus each part is identified. As a result, for different types of control information, interference is reduced by maintaining at least one CS interval.

If CQIcs denotes the number of CSs that can be allocated to the CQI according to the aforementioned configuration, CQIcs can be obtained as follows.

MathFigure 4

$$CQI_{cs} = \left\lceil \frac{AN_{cs}}{AN_{max}} \right\rceil (T_{cs} - AN_{cs} - N_{unallocated}) \quad [\text{Math. 4}]$$

Herein, ANcs denotes the number of CSs used for ACK/NACK in an RB. ANmax denotes a maximum value of CS used for ACK/NACK in the RB. Tcs denotes a maximum number of available CSs of a base sequence per one RB. $N_{unallocated}$ denotes the number of unallocated CSs.

⌈ ⌉ denotes a ceiling function.

In the table above, if ANmax=8, CQIcs is equal to 2 under the condition that ANcs=8, Tcs=12, and $N_{unallocated}$=2.

If there is an unallocated CS, a sum of CSs allocated to ACK/NACK and CQI is less than the number of available CSs of the base sequence. This is because Tcs=ANcs+CQIcs+$N_{unallocated}$.

Table 9 shows resource allocation according to a sixth embodiment of the present invention.

TABLE 9

| Ics | Ios | | | |
|---|---|---|---|---|
| | 1 | 2 | 3 | 4 |
| 1 | AN1 | AN2 | | |
| 2 | | | AN3 | SR1 |
| 3 | AN4 | AN5 | | |
| 4 | | | AN6 | SR2 |
| 5 | AN7 | AN8 | | |
| 6 | | | AN9 | SR3 |
| 7 | AN10 | AN11 | | |
| 8 | | | AN12 | SR4 |
| 9 | AN13 | AN14 | | |
| 10 | | | AN15 | SR5 |
| 11 | AN16 | AN17 | | |
| 12 | | | AN18 | SR6 |

In this case, since an RS is unnecessary in SR transmission, an orthogonal sequence unused by ACK/NACK is allocated to an SR. In allocation, at least one CS is arranged between SRs.

Figure 11:
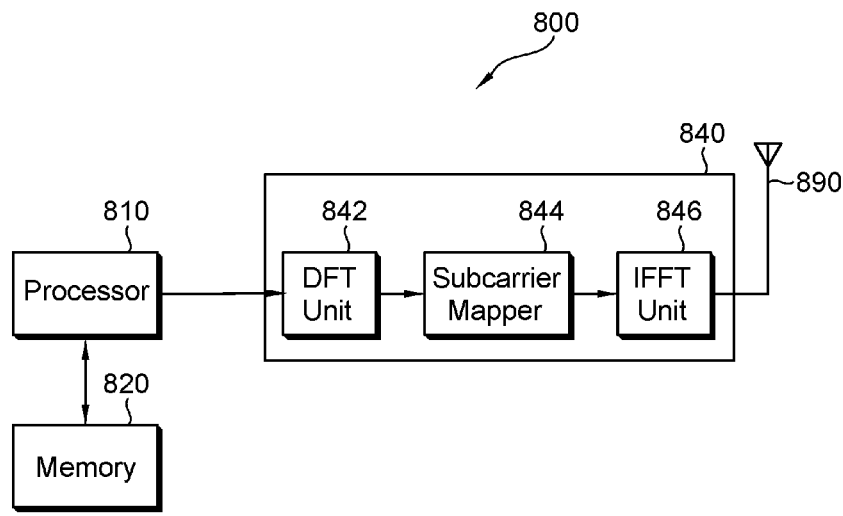
FIG. 11 is a block diagram showing an apparatus for wireless communication according to an embodiment of the present invention.

FIG. 11 is a block diagram showing an apparatus for wireless communication according to an embodiment of the present invention. The apparatus may be a part of a UE.

Referring to FIG. 11, the apparatus 800 for wireless communication includes a processor 810, a memory 820, and a signal generator 840. The memory 820 stores a base sequence. The processor 810 is coupled with the memory 820, and configures a control channel. The processor 810 generates a cyclically shifted sequence by cyclically shifting the base sequence, and processes control information by using the cyclically shifted sequence as described above. The signal generator 840 generates a transmission signal to be transmitted through an antenna 890 by using the control information processed by the processor 810.

The signal generator 840 can generate the transmission signal by using an SC-FDMA scheme. For this, the signal generator 840 can include a discrete Fourier transform (DFT) unit 842 for performing DFT, a subcarrier mapper 844, and an inverse fast Fourier transform (IFFT) unit 846 for performing IFFT. The DFT unit 842 performs DFT on an input sequence and thus outputs frequency-domain symbols. The subcarrier mapper 844 maps the frequency-domain symbols to each subcarrier. The IFFT unit 846 performs IFFT on an input symbol and thus outputs time-domain signals. The time-domain signals are transmission signals, and are transmitted through the antenna 890. The time-domain signals generated by the signal generator 840 may be generated using the SC-FDMA scheme. In this case, the time-domain signals output from the signal generator 840 are referred to as SC-FDMA symbols or OFDMA symbols.

Figure 12:
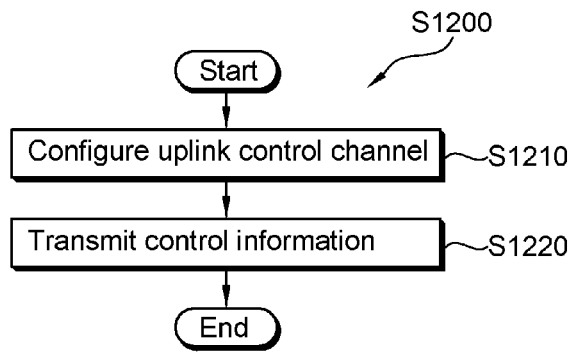
FIG. 12 shows a method of transmitting a control signal according to an embodiment of the present invention.

FIG. 12 is a flowchart showing a method of transmitting control information according to an embodiment of the present invention. The method S1200 can be performed by a UE.

Referring to FIG. 12, an uplink control channel for uplink control information is configured (step S1210). The uplink control channel can be configured using a cyclically shifted sequence that is generated by cyclically shifting a base sequence in an RB. The RB may include a plurality of contiguous subcarriers. The number of subcarriers included in the RB is equal to a length of the base sequence. A modulation sequence is generated according to a modulation symbol of the uplink control information and the cyclically shifted sequence. The modulation sequence is mapped on a plurality of SC-FDMA symbols. As a result, the uplink control channel is configured. Available CSs of the base sequence can be divided into a first part and a second part according to a type of control information. The first part and the second part can be divided by at least one unallocated CS of the base sequence. Therefore, the number of CSs belonging to the first part and the second part is less than the total number of available CSs of the base sequence.

The uplink control information is transmitted on the uplink control channel (step S1220).

Figure 13:
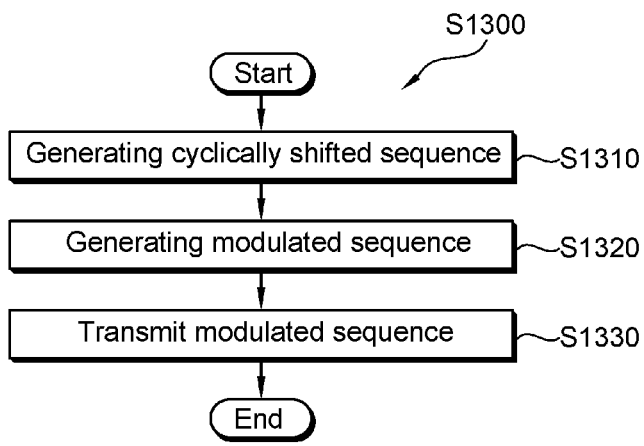
FIG. 13 shows a method of transmitting a control signal according to another embodiment of the present invention.

FIG. 13 is a flowchart showing a method of transmitting control information according to another embodiment of the present invention. The method (indicated by S1300) can be performed by a UE.

Referring to FIG. 13, a cyclically shifted sequence is generated by cyclically shifting a base sequence by a CS amount (step S1310). A modulation sequence is generated according to the cyclically shifted sequence and a modulation symbol of the control information (step S1320). The modulation sequence is transmitted on a plurality of subcarriers (step S1330). Available CSs of the base sequence can be divided into a first part and a second part according to a type of control information. The first part and the second part can be divided by at least one unallocated CS of the base sequence. Therefore, the number of CSs belonging to the first part and the second part is less than the total number of available CSs of the base sequence. The CS amount corresponds to one CS belonging to the first part or the second part.

The type of control information may include ACK/NACK information and a CQI. For example, CSs belonging to the first part may be allocated to an ACK/NACK resource, and CSs belonging to the second part may be allocated to a CQI resource.

Figure 14:
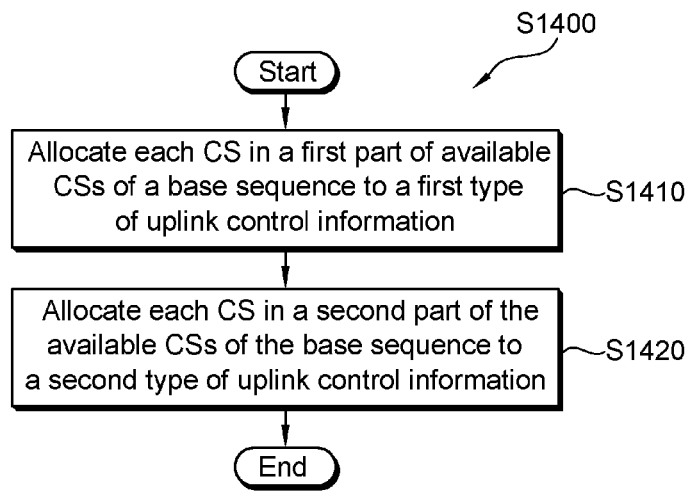
FIG. 14 is a flowchart showing a method of allocating radio resources according to an embodiment of the present invention.

FIG. 14 is a flowchart showing a method of allocating radio resources according to an embodiment of the present invention. The method (indicated by S1400) can be performed by a BS.

Referring to FIG. 14, the BS divides available CSs of a base sequence into a first part and a second part, and thereafter allocates each CS in the first part to a first type of uplink control information (step S1410). The BS allocates each CS in the second part to a second type of control information (step S1420). The first part and the second part can be divided by at least one unallocated CS of the base sequence. Therefore, the number of CSs belonging to the first part and the second part is less than the total number of available CSs of the base sequence.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting control information in a wireless communication system, the method comprising:
generating, by a user equipment, a cyclically shifted sequence by cyclically shifting a base sequence by a cyclic shift amount;
generating, by the user equipment, a modulation symbol for an acknowledgement (ACK)/not-acknowledgment (NACK) information;
generating, by the user equipment, a modulated sequence based on the modulation symbol and the cyclically shifted sequence; and
transmitting, by the user equipment, the modulated sequence in a mixed resource block, the mixed resource block including $T_{CS}$ subcarriers,
wherein at least one cyclic shift in the mixed resource block is allocated to a resource for a channel quality indicator (CQI), and
wherein a number of cyclic shifts used for the CQI in the mixed resource block is equal to or less than $$\left\lceil \frac{AN_{cs}}{8} \right\rceil \cdot (T_{cs} - AN_{cs} - 2),$$

where $AN_{CS}$ is a number of cyclic shifts used for the ACK/NACK information in the mixed resource block.

2. The method of claim 1, wherein the $T_{CS}$ subcarriers are contiguous.

3. The method of claim 1, wherein the modulated sequence is generated by multiplying the cyclically shifted sequence by the modulation symbol.

4. An apparatus for wireless communication, comprising:
a memory for storing a base sequence; and
a processor coupled with the memory and configured to:
generate a cyclically shifted sequence by cyclically shifting the base sequence;
generate a modulation symbol for an acknowledgement (ACK)/not-acknowledgment (NACK) information;
generating a modulated sequence based on the modulation symbol and the cyclically shifted sequence; and
transmit the modulated sequence in a mixed resource block, the mixed resource block including $T_{CS}$ subcarriers,
wherein at least one cyclic shift in the mixed resource block is allocated to a resource for a channel quality indicator (CQI), and
wherein a number of cyclic shifts used for the CQI in the mixed resource block is equal to or less than $$\left\lceil \frac{AN_{cs}}{8} \right\rceil \cdot (T_{cs} - AN_{cs} - 2),$$

where $AN_{CS}$ is a number of cyclic shifts used for the ACK/NACK information in the mixed resource block.

5. A method of allocating radio resources in a wireless communication system, performed by a base station, the method comprising:
allocating first cyclic shifts used for a transmission of an acknowledgement (ACK)/not-acknowledgment (NACK) information; and
allocating second cyclic shifts used for a transmission of a channel quality indicator (CQI),
wherein the ACK/NACK information and the CQI are received from at least one user equipment in a mixed resource block, the mixed resource block including $T_{CS}$ subcarriers, and
wherein a number of the second cyclic shifts is equal to or less than $$\left\lceil \frac{AN_{cs}}{8} \right\rceil \cdot (T_{cs} - AN_{cs} - 2),$$

where $AN_{CS}$ is a number of the first cyclic shifts.

6. The method of claim 1, wherein the cyclic shifts used for the CQI and the cyclic shifts used for the ACK/NACK information in the mixed resource block are separated by at least one unallocated cyclic shift.

7. The apparatus of claim 4, wherein the cyclic shifts used for the CQI and the cyclic shifts used for the ACK/NACK information in the mixed resource block are separated by at least one unallocated cyclic shift.

* * * * *